United States Patent
Huo et al.

(10) Patent No.: US 11,137,309 B2
(45) Date of Patent: Oct. 5, 2021

(54) STRAIN GAUGE TYPE PRESSURE SENSING

(71) Applicant: SENSATA TECHNOLOGIES, INC., Attleboro, MA (US)

(72) Inventors: Shihong Huo, Bedford, MA (US); Mark W. McBrine, Mansfield, MA (US); Eric A. Wolf, Boston, MA (US); Prasanth Ambady, Pawtucket, RI (US); Yu Wang, Sharon, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 152 days.

(21) Appl. No.: 16/542,806

(22) Filed: Aug. 16, 2019

(65) Prior Publication Data

US 2021/0048362 A1    Feb. 18, 2021

(51) Int. Cl.
     *G01L 17/00*      (2006.01)
(52) U.S. Cl.
     CPC .................................. *G01L 17/00* (2013.01)
(58) Field of Classification Search
     None
     See application file for complete search history.

(56) References Cited

U.S. PATENT DOCUMENTS

| 7,856,885 B1 | 12/2010 | Bhansali et al. |
| 2009/0007680 A1 | 1/2009 | Kurtz et al. |
| 2016/0282205 A1 | 9/2016 | Huo et al. |

FOREIGN PATENT DOCUMENTS

EP    2058639 A2    5/2009

OTHER PUBLICATIONS

International Search Report and Written Opinion, PCT/US2020/047662, dated Dec. 17, 2020, 11 pages.

*Primary Examiner* — Lisa M Caputo
*Assistant Examiner* — Nigel H Plumb
(74) *Attorney, Agent, or Firm* — Mark H. Williams (57) ABSTRACT

A pressure sensor apparatus for strain gauge pressure sensing includes a plurality of strain gauges including a first strain gauge and a second strain gauge. The pressure sensor apparatus also includes a diaphragm coupled between the plurality of strain gauges and an object configured to apply pressure to the diaphragm. The diaphragm has a first portion and a second portion. The first portion has a first thickness between the object and the first strain gauge. The second portion has a second thickness between the object and the second strain gauge. In an uncompressed state, the second thickness is greater than the first thickness.

7 Claims, 12 Drawing Sheets

STRAIN GAUGE TYPE PRESSURE SENSING

FIELD OF THE INVENTION

The present disclosure relates to pressure sensors, and more specifically, strain gauge type pressure sensing.

BACKGROUND OF THE INVENTION

Pressure sensors are used for control and monitoring in thousands of applications and can vary drastically in terms of technology, configuration, and cost. In a typical strain gauge pressure sensor, a strain gauge with a foil pattern is applied to a diaphragm having a uniform thickness between the strain gauge and an object applying the force (pressure) to be measured. As the force applied to the diaphragm from the object causes the diaphragm to deform, the foil pattern of the strain gauge also deforms causing the electrical resistance of the foil pattern to change. This new resistance of the strain gauge may be measured and associated with a particular pressure value.

In this configuration, the greater the thickness of the diaphragm, the greater the pressure that is required to compress the diaphragm and the greater the pressure that is capable of being measured by the pressure sensor. However, the greater the diaphragm thickness and the greater the pressure range that the pressure sensor is capable of measuring, the greater the amount of pressure that is associated with each incremental amount of compression of the diaphragm. That is, the greater the diaphragm thickness, the lesser the sensitivity or accuracy of the pressure sensor to each increment of change in pressure applied by the object for a usually fixed resolution sensor. With every incremental increase in pressure, the percentage of change between the previous amount of pressure and the new amount of pressure decreases. For example, a pressure increase from 100 bars to 101 bars represents a 1% increase in pressure, whereas an increase from 1000 bars to 1001 bars represents a 0.1% increase in pressure. This principle impacts the accuracy of the pressure sensor, especially resulting worse accuracy (or resolution) for lower pressure range. For example, a pressure sensor that reports a typical 1% FS error for a 100 bar full scale application, is only 1 bar off, but a pressure sensor that reports a typical 1% FS error for 1000 bar full scale application is actually 10 bar off. Obviously, the accuracy of a high pressure full scale sensor is not good for a low pressure range due to low resolution. As a result, designing a pressure sensor that is sensitive to high-pressure ranges often involves compromising low-pressure range accuracy. However, there are many applications that need tight accuracy for low pressure range, and require a high pressure full scale output.

SUMMARY OF THE INVENTION

In a particular embodiment of the present disclosure, a pressure sensor apparatus for strain gauge pressure sensing is disclosed that includes a single diaphragm with two portions having two different thicknesses between an object applying a force and a plurality of strain gauges. Each portion is coupled to a particular strain gauge, such that the strain gauge for that portion changes in resistance in response to changes in thickness of that portion. Because each strain gauge is coupled to a particular portion with a different diaphragm thickness, the sensitivity to pressure of each strain gauge is different. In a particular embodiment, the second portion of the diaphragm is thicker than the first portion of the diaphragm, such that the first strain gauge that is coupled to the first diaphragm portion is sensitive to a low-pressure range and provides better accuracy than the second strain gauge for the lower pressure range, and simultaneously the second diaphragm portion can provide a higher pressure output. Therefore, by having a pressure sensor apparatus with a single diaphragm having two different thicknesses, the pressure sensor apparatus is capable of measuring a high-pressure range without having to compromise low-pressure range sensitivity and accuracy.

In a particular embodiment, a pressure sensor apparatus for strain gauge pressure sensing is disclosed that includes a plurality of strain gauges comprising a first strain gauge and a second strain gauge. The pressure sensor apparatus also includes a diaphragm coupled between the plurality of strain gauges and an object configured to apply pressure to the diaphragm. The diaphragm has a first portion and a second portion. The first portion has a first thickness between the object and the first strain gauge. The second portion has a second thickness between the object and the second strain gauge. In an uncompressed state, the second thickness is greater than the first thickness. The first strain gauge is configured to change resistance in response to a change in thickness of the first portion of the diaphragm and the second strain gauge is configured to change resistance in response to a change in thickness of the second portion of the diaphragm. Because each strain gauge is configured to respond to changes in thickness of two different portions of the diaphragm having two different thicknesses, the pressure sensor apparatus is capable of having two different pressure range sensitivities.

In a particular embodiment, a method for strain gauge pressure sensing is disclosed that includes an electronics module, which is coupled to a plurality of strain gauges including a first strain gauge and a second strain gauge, receiving a first output associated with a resistance of the first strain gauge. The method also includes the electronics module receiving a second output associated with a resistance of the second strain gauge. In addition, the method also includes the electronics module outputting, based on the first output and the second output, one or more pressure values. In this particular embodiment, the plurality of strain gauges is coupled to a diaphragm and the diaphragm is coupled between the plurality of strain gauges and an object configured to apply pressure to the diaphragm. The diaphragm has a first portion and a second portion. The first portion of the diaphragm has a first thickness between the object and the first strain gauge. The second portion of the diaphragm has a second thickness between the object and the second strain gauge. In an uncompressed state, the second thickness is greater than the first thickness. The first strain gauge is configured to change resistance in response to a change in thickness of the first portion of the diaphragm. The second strain gauge is configured to change resistance in response to a change in thickness of the second portion of the diaphragm.

As will be explained below in greater detail, because the electronics module receives two different outputs from two different strain gauges, each with a different pressure range sensitivity, one of the advantages of this embodiment is that the electronics module may determine which of the strain gauge outputs is best to use for a particular pressure range. For example, if one or more of the strain gauge outputs indicate that the pressure being measured is in a high-pressure range, the electronics module may use the output from the strain gauge having a high-pressure range sensitivity to determine a pressure value output. Continuing with this example, if one or more of the strain gauge outputs indicate that the pressure being measured is in a low-pressure range, the electronics module may use the output from the strain gauge having a low-pressure range sensitivity to determine a pressure value output. Because the electronics module is configured to utilize two different strain gauges outputs with two different sensitivities, the accuracy of the pressure reported by the electronics module may be greater over a wide range of pressure than an electronics module that uses outputs from strain gauges having substantially the same pressure range sensitivity.

The foregoing and other objects, features, and other advantages of the present disclosure will be apparent from the following more particular descriptions of exemplary embodiments of the present disclosure as illustrated in the accompanying drawings wherein like reference numbers generally represent like parts of exemplary embodiments of the present disclosure.

BRIEF DESCRIPTION OF THE DRAWINGS

So that those having ordinary skill in the art to which the disclosed technology appertains will more readily understand how to make and use the same, reference may be had to the following drawings.

DETAILED DESCRIPTION

Figure 1:
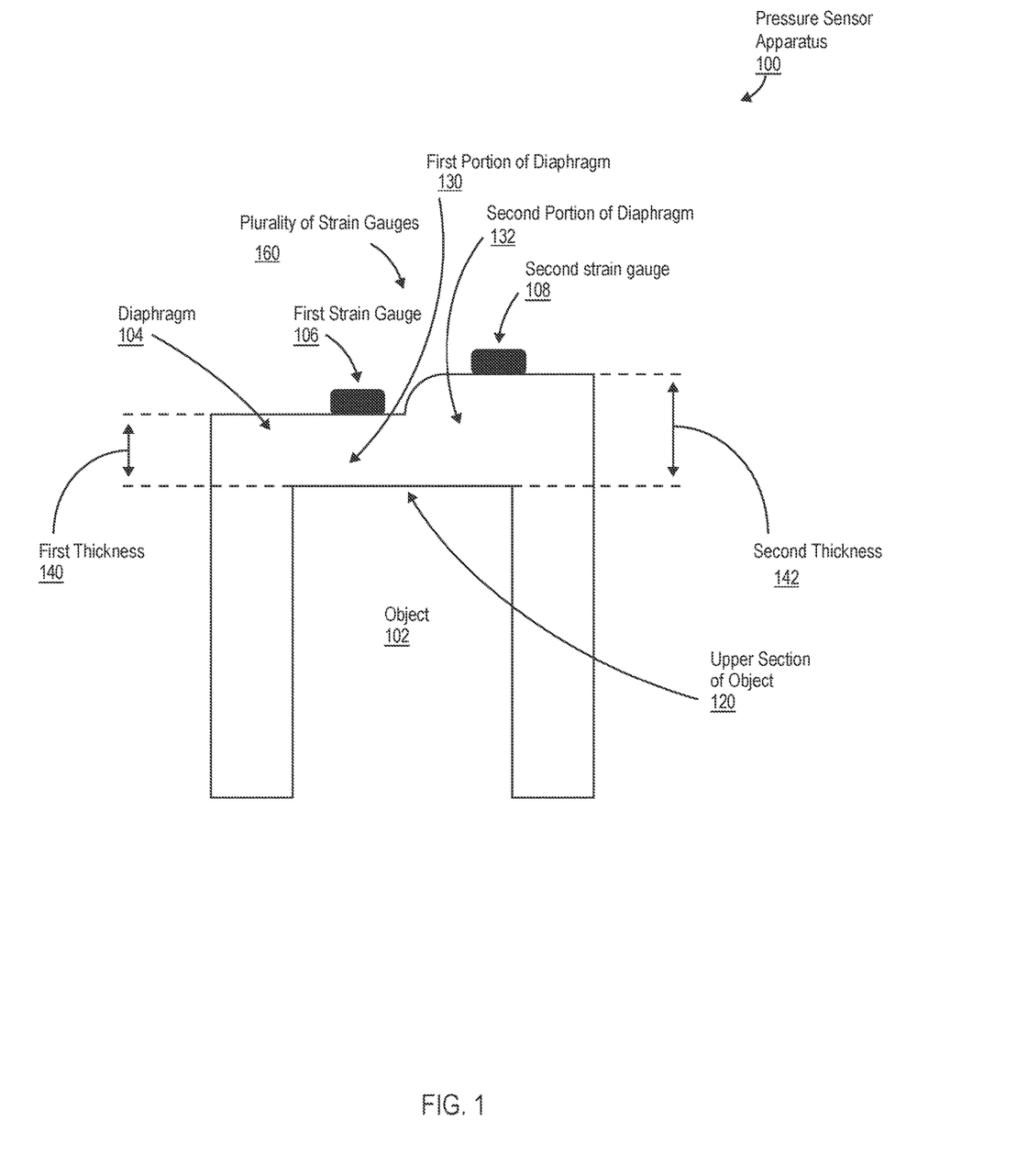
FIG. 1 is a cross-section view of an example of a pressure sensor apparatus for strain gauge type pressure sensing, according to at least one embodiment of the present disclosure.

FIG. 1 is a cross-section view of a pressure sensor apparatus (100) for strain gauge type pressure sensing, according to at least one embodiment of the present disclosure. The pressure sensor apparatus (100) of FIG. 1 includes a diaphragm (104) coupled between an object (102) and a plurality (160) of strain gauges.

In the example of FIG. 1, the object (102) is configured to apply a force to the diaphragm (104). In a particular embodiment, the object (102) is a cavity having a lower portion and an upper portion. In this embodiment, the lower portion of the cavity is open to receiving gasses or liquids. As the force of the liquids or gasses applies pressure to the upper section of the cavity, the upper section of the cavity applies a force to the diaphragm (104). The diaphragm (104) is flexible and capable of compressing. As the object (102) or cavity as in the above example, applies a force (pressure) to the diaphragm (104), the diaphragm (104) deforms or compresses. The plurality (160) of strain gauges are configured to measure the strain on the diaphragm (104).

In the example of FIG. 1, the diaphragm (104) includes a first portion (130) and a second portion (132). The first portion (130) has a first thickness (140) between an upper section (120) of the object (102) and the first strain gauge (106). The second portion (132) has a second thickness (142) between the upper section (120) of the object (102) and the second strain gauge (108). In a particular embodiment, in an uncompressed state, the second thickness (142) is greater than the first thickness (140). The uncompressed state refers to when the object (102) is not applying a substantial force to the diaphragm (104). Although the diaphragm (104) is a single piece, the diaphragm has two distinct portions, each of which has a different diaphragm thickness between the upper section (120) of the object (102) and one of the strain gauges of the plurality (160) of strain gauges.

A strain gauge is a device that includes an electrical conductor to measure strain on an object. As explained above, the strain gauges (106, 108) of FIG. 1 are configured to measure the strain of the diaphragm (104) in response to a force on the diaphragm (104). In a particular embodiment, the first strain gauge (106) and the second strain gauge (108) are glass bonded to the upper section (120) of the diaphragm (104). In a particular embodiment, the plurality of strain gauges includes microfused silicon strain gauges (MSGs). Examples of other types of material that the strain gauges may use include but are not limited to Silicon (Monocrystalline), Polysilicon Thin Film, Bonded Metal Foil, Thick Film, Silicon-on-Sapphire and Sputtered Thin Film. The strain gauges may be covered in a coating, such as a silicone-based conformal coat, which may protect the strain gauges from corrosion.

The first strain gauge (106) may be configured to change resistance in response to a change in thickness of the first portion (130) of the diaphragm (104). The second strain gauge (108) may be configured to change resistance in response to a change in thickness of the second portion (132) of the diaphragm (104).

Because each strain gauge is configured to respond to changes in thickness of two different portions of the diaphragm having two different thicknesses, the pressure sensor apparatus (100) is capable of having two different pressure range sensitivities and providing two pressure range outputs. In a particular embodiment, the first strain gauge (106) that is coupled to the first diaphragm portion (130) may be sensitive to a low-pressure range and the second strain gauge (108) that is coupled to the second diaphragm portion (132) may be sensitive to a high-pressure range. By having a pressure sensor apparatus (100) with a single diaphragm (104) having two different thicknesses (140, 142), the pressure sensor apparatus (100) is capable of measuring a high-pressure range without having to compromise low-pressure range sensitivity and accuracy.

Figure 2:
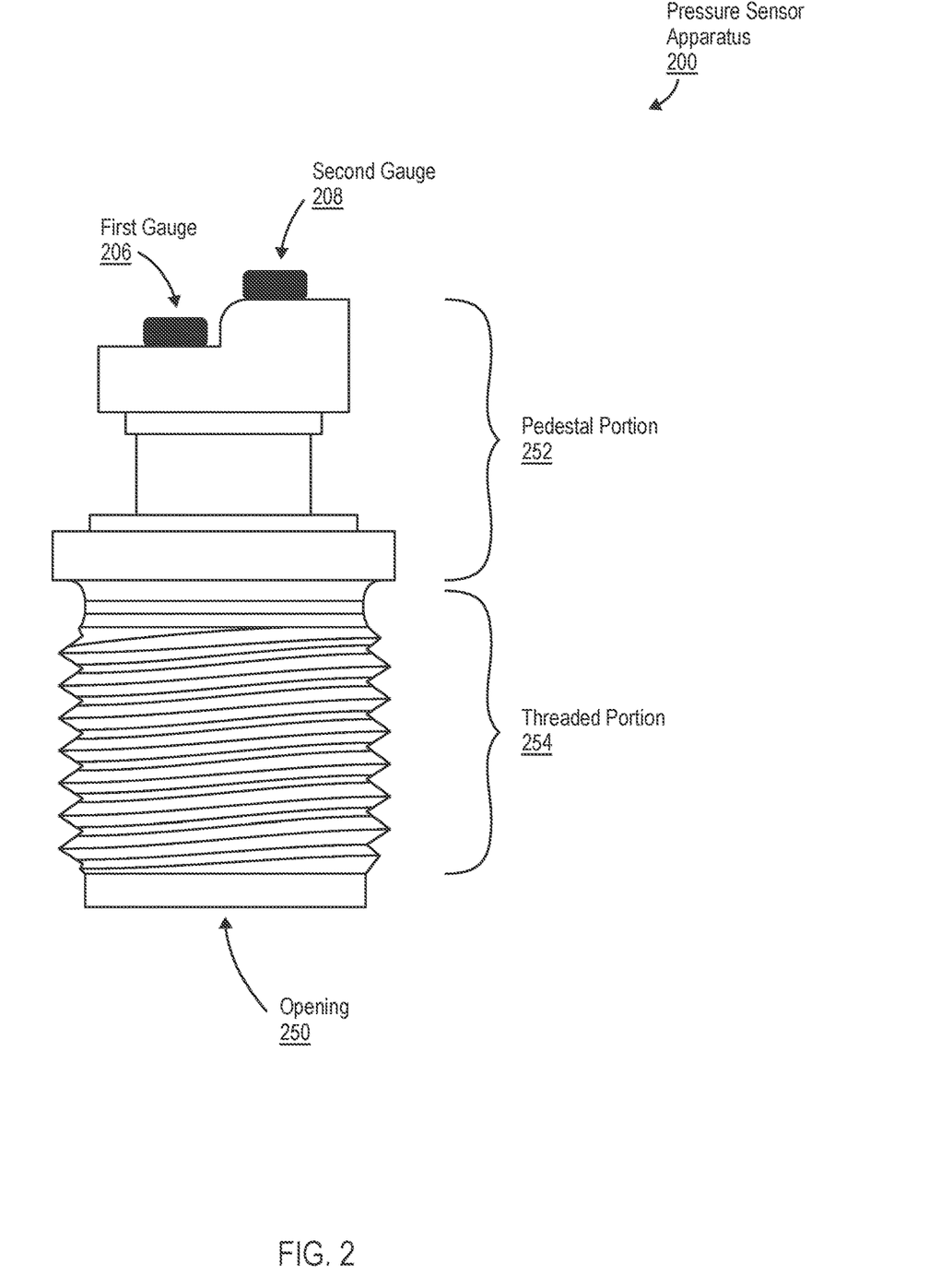
FIG. 2 depicts an example of a pressure sensor apparatus for strain gauge type pressure sensing, according to at least one embodiment of the present disclosure.

FIG. 2 depicts an example of a pressure sensor apparatus (200), according to at least one embodiment of the present disclosure. The pressure sensor apparatus (200) of FIG. 2 includes a pedestal portion (252) and a threaded portion (254). In a particular embodiment, the pedestal portion (252) and the threaded portion (254) are either formed from a single piece of medal or welded two pieces. The pressure sensor apparatus (200) also includes an opening (250) for receiving pressure to be measured by the pressure sensor apparatus (200). The threaded portion (254) of FIG. 2 includes threads (or other type of fixture) that may be used to secure the pressure sensor apparatus (200) when the multi-range pressure is mounted in a fixture (e.g., a rail).

In addition, the pressure sensor apparatus (200) includes a first strain gauge (206) and a second strain gauge (208) secured to the pedestal portion (252). As will be explained in FIG. 3, the first strain gauge (206) may be coupled to a first portion of a diaphragm (not illustrated) such that the first strain gauge (206) may be configured to change resistance in response to a change in thickness of the first portion of the diaphragm. The second strain gauge (208) may be coupled to a second portion of the diaphragm such that the second strain gauge (208) may be configured to change resistance in response to a change in thickness of the second portion of the diaphragm.

In a particular embodiment, the thickness of the first diaphragm portion is different from the thickness of the second diaphragm portion. Because each strain gauge is configured to respond to changes in thickness of two different portions of the diaphragm having two different thicknesses, the pressure sensor apparatus (200) may be capable of having two different pressure range sensitivities.

Figure 3:
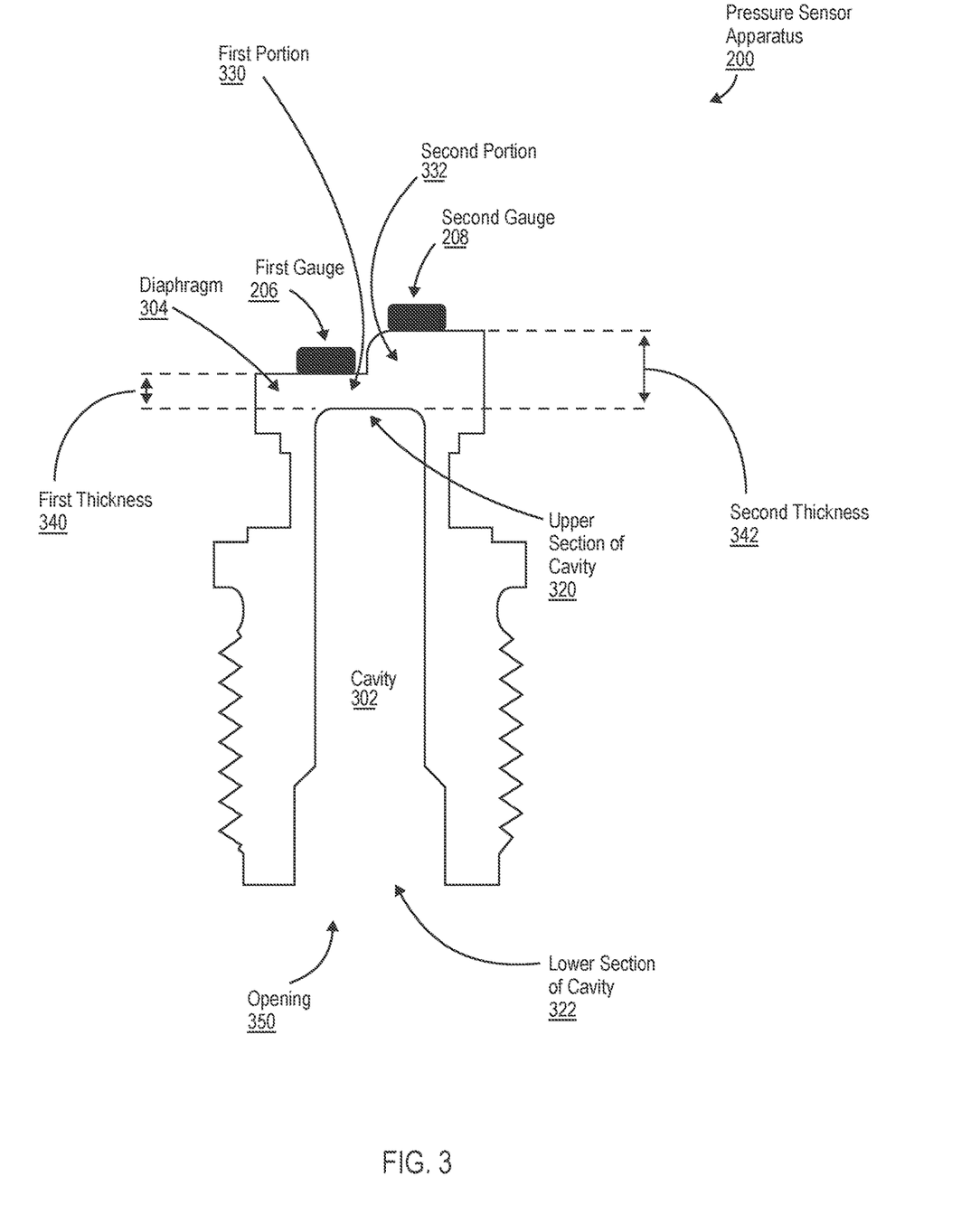
FIG. 3 is a cross-section view of the pressure sensor apparatus of FIG. 2, according to at least one embodiment of the present disclosure.

FIG. 3 is a cross-section view of the pressure sensor apparatus (200) of FIG. 2, according to at least one embodiment of the present disclosure. In the example of FIG. 3, the pressure sensor apparatus (200) includes a cavity (302) having an upper section (320) and a lower section (322). In the example of FIG. 3, the lower section (322) is open for receiving pressure to be measured by the pressure sensor apparatus (200) at opening (350). Readers of skill in the art will realize that the shape of the cavity (302) is one example. According to other embodiments of the present disclosure, the cavity (302) may be larger or smaller and have a variety of dimensions. The pressure sensor apparatus (200) also includes a diaphragm (304) between the upper section (320) of the cavity (302) and the strain gauges (206, 208).

The diaphragm (304) of FIG. 3 has a first portion (330) and a second portion (332). The first portion (330) has a first thickness (340) between the upper section (320) of the cavity (302) and the first strain gauge (206). The second portion (332) has a second thickness (342) between the upper section (320) of the cavity (302) and the second strain gauge (208). In the example of FIG. 3, in an uncompressed state, the second thickness (342) is greater than the first thickness (340).

The first strain gauge (206) may be coupled to the first portion (330) of the diaphragm (304) such that the first strain gauge (206) may be configured to change resistance in response to a change in thickness of the first portion (330) of the diaphragm (304). The second strain gauge (208) may be coupled to the second portion (332) of the diaphragm (304) such that the second strain gauge (208) may be configured to change resistance in response to a change in thickness of the second portion (332) of the diaphragm (304).

In a particular embodiment, the first thickness (340) of the first diaphragm portion (330) is different from the second thickness (342) of the second diaphragm portion (332). Because each strain gauge (206, 208) is configured to respond to changes in thickness of two different portions (330, 332) of the diaphragm (304) having two different thicknesses (340, 342), the pressure sensor apparatus (200) may be capable of having two different pressure range sensitivities.

In a particular embodiment, the first strain gauge (206) that is coupled to the first diaphragm portion (330) may be sensitive to a low-pressure range and the second strain gauge (208) that is coupled to the second diaphragm portion (332) may be sensitive to a high-pressure range. By having a pressure sensor apparatus (200) with a single diaphragm (304) having two different thicknesses (340, 342), the pressure sensor apparatus (200) is capable of measuring a high-pressure range without having to compromise low-pressure range sensitivity and accuracy.

Figure 4:
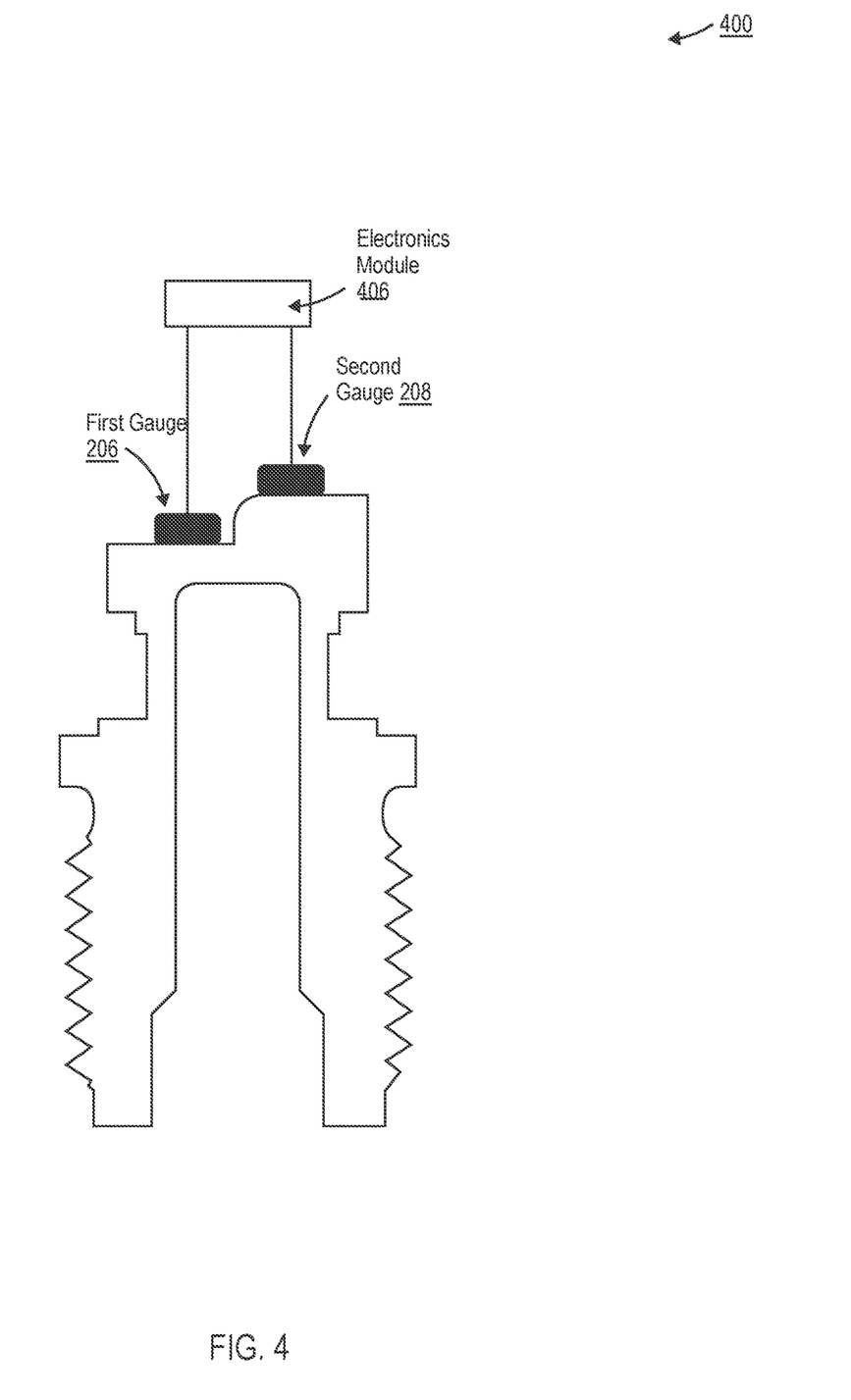
FIG. 4 depicts an example of a pressure sensor apparatus for strain gauge type pressure sensing, according to at least one embodiment of the present disclosure.

FIG. 4 depicts an example of a pressure sensor apparatus (400), according to at least one embodiment of the present disclosure. The pressure sensor apparatus (400) includes the following components of the pressure sensor apparatus (200) of FIGS. 2-3: a cavity (302); a first strain gauge (206); a second strain gauge (208); a diaphragm (304) having a first portion (330) with a first thickness (340) and a second portion (332) with a second thickness (342).

In addition, the pressure sensor apparatus (400) of FIG. 4 also includes an electronics module (406) that is coupled to the first strain gauge (206) and the second strain gauge (208). In a particular embodiment, the electronics module includes a measuring circuit for measuring a resistance of each strain gauge. In a particular embodiment, either a Wheatstone bridge or half of a Wheatstone bridge may be used to amplify the output of the strain gauges and reduce sensitivity to errors.

The electronics module (406) may also include automated computer circuitry that is configured to: receive a first output associated with a resistance of the first strain gauge (206); receive a second output associated with a resistance of the second strain gauge (208); and output, based on the first output and the second output, one or more pressure values. Alternatively, the electronics module (406) may include computer hardware and software for measuring pressure with a pressure sensor apparatus. For example, the electronics module may include a processor coupled to memory. In this example, the memory may be a computer readable storage medium that includes computer program instructions that when executed by the processor cause the processor to receive a first output associated with a resistance of the first strain gauge (206); receive a second output associated with a resistance of the second strain gauge (208); and output, based on the first output and the second output, one or more pressure values. Readers of skill in the art will realize any combination of circuitry, computer hardware, and software may be used to perform one or more functions of the electronics module (406).

As will be explained further below, because the electronics module (406) receives two different outputs from two different strain gauges, each with a different pressure range sensitivity, one of the advantages of this embodiment is that the electronics module (406) may determine which of the strain gauge outputs is more accurate to use for a particular pressure range. For example, if one or more of the strain gauge outputs indicate that the pressure being measured is in a high-pressure range, the electronics module (406) may use the output from the strain gauge having a greater diaphragm thickness to determine a pressure value output. Continuing with this example, if one or more of the strain gauge outputs indicate that the pressure being measured is in a low-pressure range, the electronics module (406) may use the output from the strain gauge having a smaller diaphragm thickness to determine a pressure value output. Because the electronics module is configured to utilize two different strain gauges outputs with two different sensitivities, the accuracy of the pressure reported by the electronics module (406) may be greater over a wide range of pressure than an electronics module that uses outputs from strain gauges having substantially the same pressure range sensitivity.

Figure 5A:
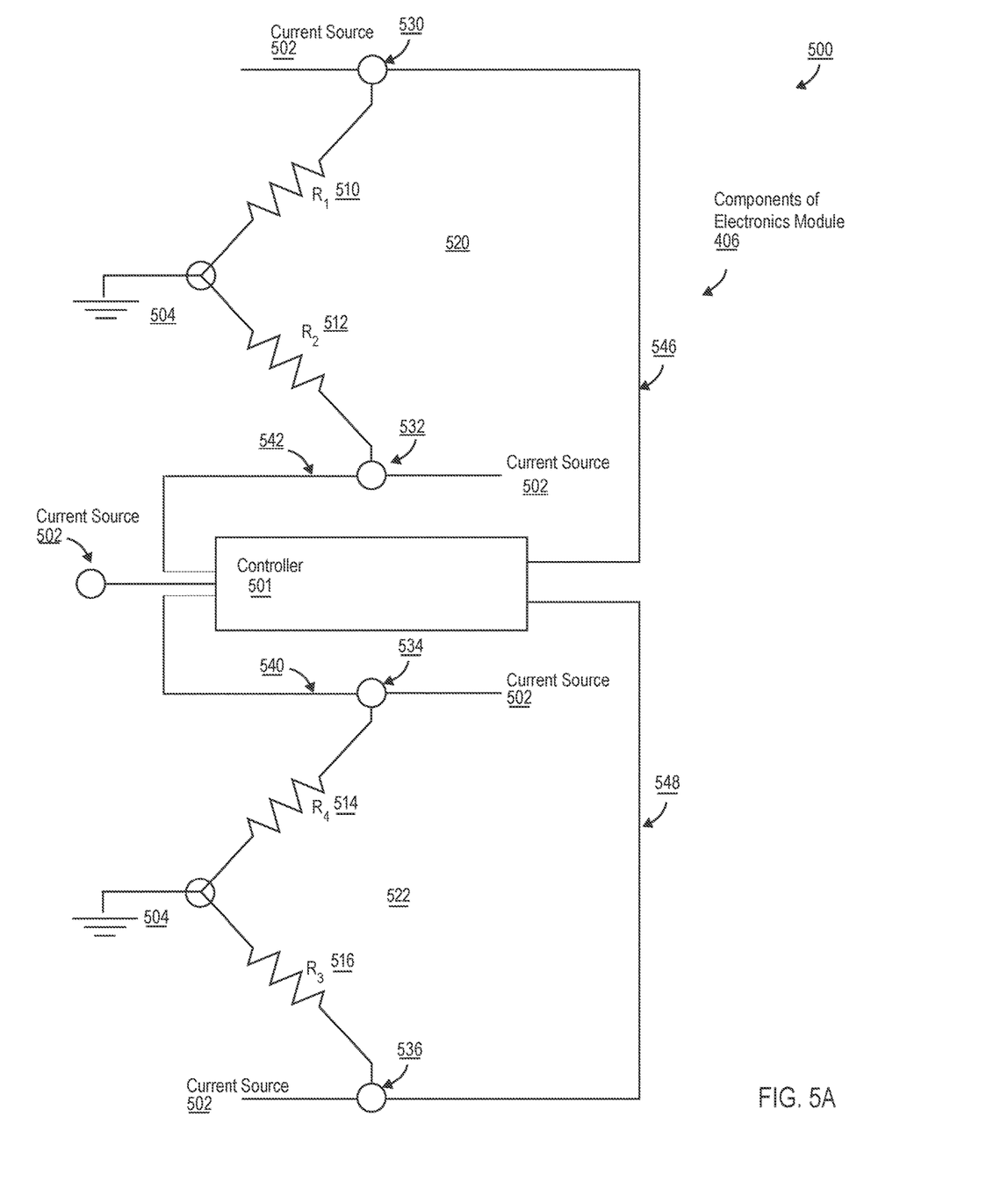
FIG. 5A depicts an example of a pressure sensor apparatus for strain gauge type pressure sensing, according to at least one embodiment of the present disclosure.

FIG. 5A depicts an example pressure sensor apparatus (500), according to at least one embodiment of the present disclosure. The pressure sensor apparatus (500) of FIG. 5 illustrates example components of the electronics module (406) of FIG. 4.

In the example of FIG. 5A, the components of the electronics module (406) include a first bridge configuration having a first strain bridge gage (520), which contains two resistors R1 (510) and R2 (512), a second strain bridge gage (522), containing resistors of R3 (516) and R4 (514). During operation, an excitation current source (502) may be applied to the bridge configurations along with a connection to ground (504). In a particular embodiment, the excitation current source (502) is very stable and the bridge resistors are high-precision resistors that have a very low temperature coefficient. The gages' resistors were placed in proper location so that resistors' resistance will increase for resistors in tension zone (R2 (512) and R3 (516)), and reduce for resistors in compression zone (R1 (510) and R4 (514)). In a particular embodiment, the two pressure outputs are proportionally corelated to the voltage variation of these resistors' resistance change.

The voltage at a first terminal (532) and a second terminal (530) may form the first output associated with the first strain gauge (206) and may be measured by the controller (501) via leads (542, 546). The controller (501) may also be configured to receive the second output from the second strain gauge (208) by measuring the voltage at a third terminal (534) and a fourth terminal (536), via leads (540, 548) coupled to the second bridge configuration. In operation, the resistance of the strain gauges (206, 208) may change based on the amount of pressure in the cavity of the pressure sensor apparatus. By measuring the voltage difference between the first terminal (532) and the second terminal (530) and the voltage difference between the third terminal (534) and the fourth terminal (536), one can determine the resistance of the strain gauges (206, 208).

In the example of FIG. 5A, the components of the electronics module (406) also include a controller (501). The controller (501) may include automated computer circuitry that is configured to: receive the first output associated with a resistance of the first strain gauge (206); receive the second output associated with a resistance of the second strain gauge (208); and output, based on the first output and the second output, one or more pressure values. Alternatively, the controller (501) may include computer hardware and software for measuring pressure with a pressure sensor apparatus. For example, the electronics module may include a processor coupled to memory. In this example, the memory may be a computer readable storage medium that includes computer program instructions that when executed by the processor cause the processor to receive the first output associated with a resistance of the first strain gauge (206); receive the second output associated with a resistance of the second strain gauge (208); and output, based on the first output and the second output, one or more pressure values. Readers of skill in the art will realize any combination of circuitry, computer hardware, and software may be used to perform one or more functions of the controller (501).

Figure 5B:
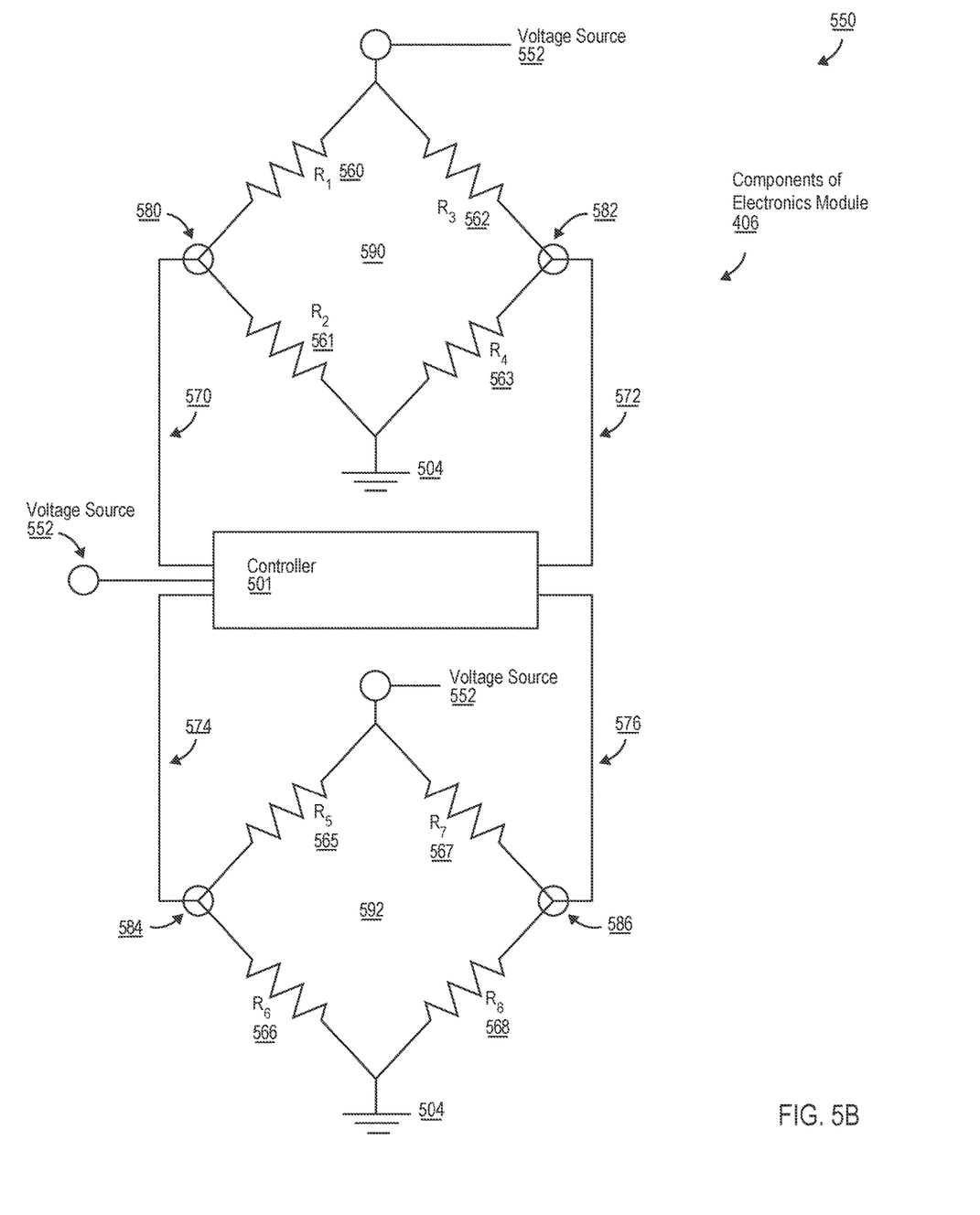
FIG. 5B depicts an example of a pressure sensor apparatus for strain gauge type pressure sensing, according to at least one embodiment of the present disclosure.

FIG. 5B depicts an example pressure sensor apparatus (550), according to at least one embodiment of the present disclosure. The pressure sensor apparatus (550) of FIG. 5B illustrates example components of the electronics module (406) of FIG. 4.

In the example of FIG. 5B, the components of the electronics module (406) include a first bridge configuration having a first strain bridge gage (590), which contains four resistors of R1 (560), R2 (561), R3 (562), and R4 (563). The components of the electronics module (406) also include a second bridge configuration having a second strain bridge gage (592) containing resistors of R5 (565), R6 (566), R7 (567), and R8 (568). During operation, a voltage source (552) may be applied to the bridge configurations along with a connection to ground (504). The gages' resistors were placed in proper location so that resistors' resistance will increase for resistors in tension zone (R2 (561), R3 (562), R6 (566), and R7(567)), and reduce for resistors in compression zone (R1 (560), R4 (563), R5 (565), and R8 (568)). In a particular embodiment, the two pressure outputs are proportionally corelated to the voltage variation of these resistors' resistance change.

In the example of FIG. 5B, the voltage at a first terminal (580) and a second terminal (582) may form the first output associated with the first strain gauge (206) and may be measured by the controller (501) via leads (570, 572). The controller (501) may also be configured to receive the second output from the second strain gauge (208) by measuring the voltage at a third terminal (584) and a fourth terminal (586), via leads (574, 576) coupled to the second bridge configuration. In operation, the resistance of the strain gauges (206, 208) may change based on the amount of pressure in the cavity of the pressure sensor apparatus. By measuring the voltage difference between the first terminal (580) and the second terminal (582) and the voltage difference between the third terminal (584) and the fourth terminal (586), one can determine the resistance of the strain gauges (206, 208).

It should be understood that FIG. 5A and FIG. 5B. merely illustrates two examples configuration of the circuitry of the electronics module (406) of FIG. 4 and readers of skill in the art will realize that other configurations may be used.

Figure 6:
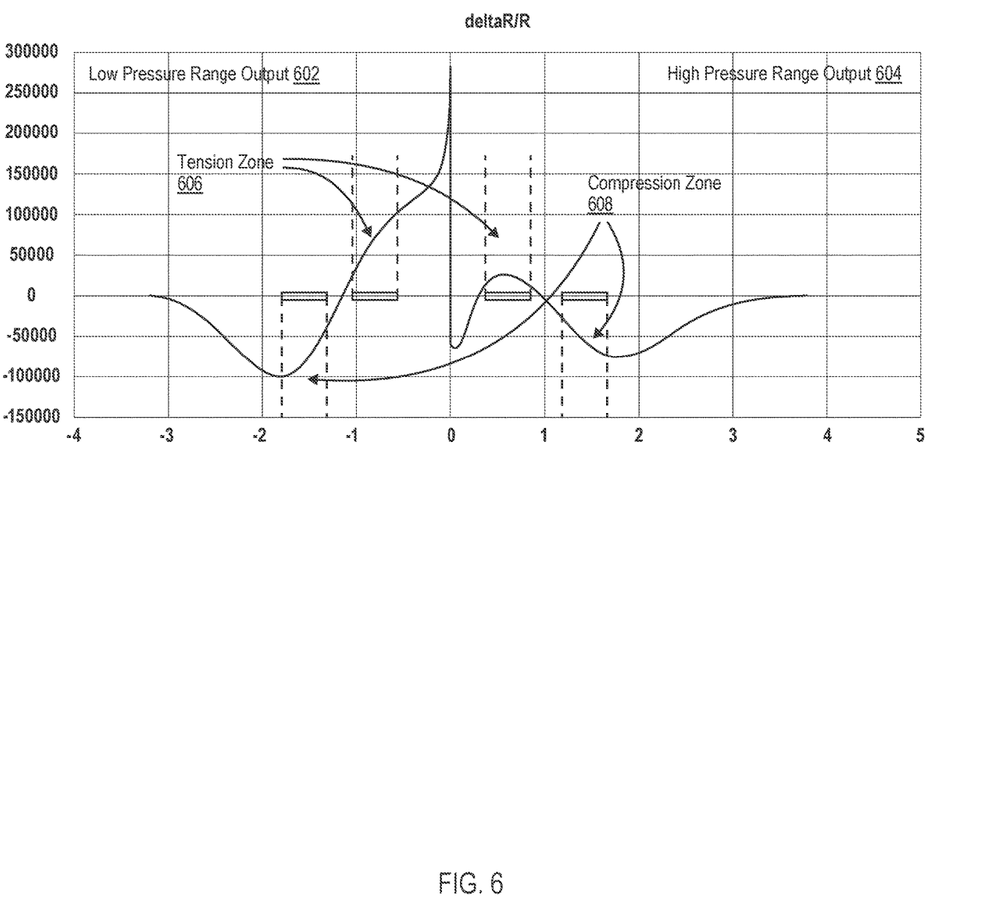
FIG. 6 is a graph that illustrates for a low pressure observed by a pressure sensor apparatus, the output of two strain gauges of the pressure sensor apparatus, according to at least one embodiment of the present disclosure.

FIG. 6 is a graph illustrates for a low pressure observed by a pressure sensor apparatus, the output of two strain gauges of the pressure sensor apparatus, according to at least one embodiment of the present disclosure. The strain gauges used for the outputs in FIG. 6 may be any pair of strain gauges from FIGS. 1-5. For example, the left side (602) of the graph may show the output of the first strain gauge (206) of FIG. 2 and the right side (604) of the graph may show the output of the second strain gauge (208) of FIG. 2. Continuing with this example, the first gauge may be configured for sensitivity to a low-pressure range and the second gauge may be configured for sensitivity to a high-pressure range. Because the pressure being observed by the pressure sensor apparatus is low-pressure (smaller diaphragm thickness), the range in output at the tension zone (606) and the compression zone (608) of the first strain gauge provides a larger arch than the range in output at the tension zone (606) and the compression zone (608) of the second strain gauge. As a result, the output of the first strain gauge may provide a better output to use as a basis for a pressure value output by the electronics module. Because the electronics module is configured to utilize two different strain gauges outputs with two different sensitivities, the accuracy of the pressure reported by the electronics module (406) may be greater over a wide range of pressure than an electronics module that uses outputs from strain gauges having substantially the same pressure range sensitivity.

Figure 7:
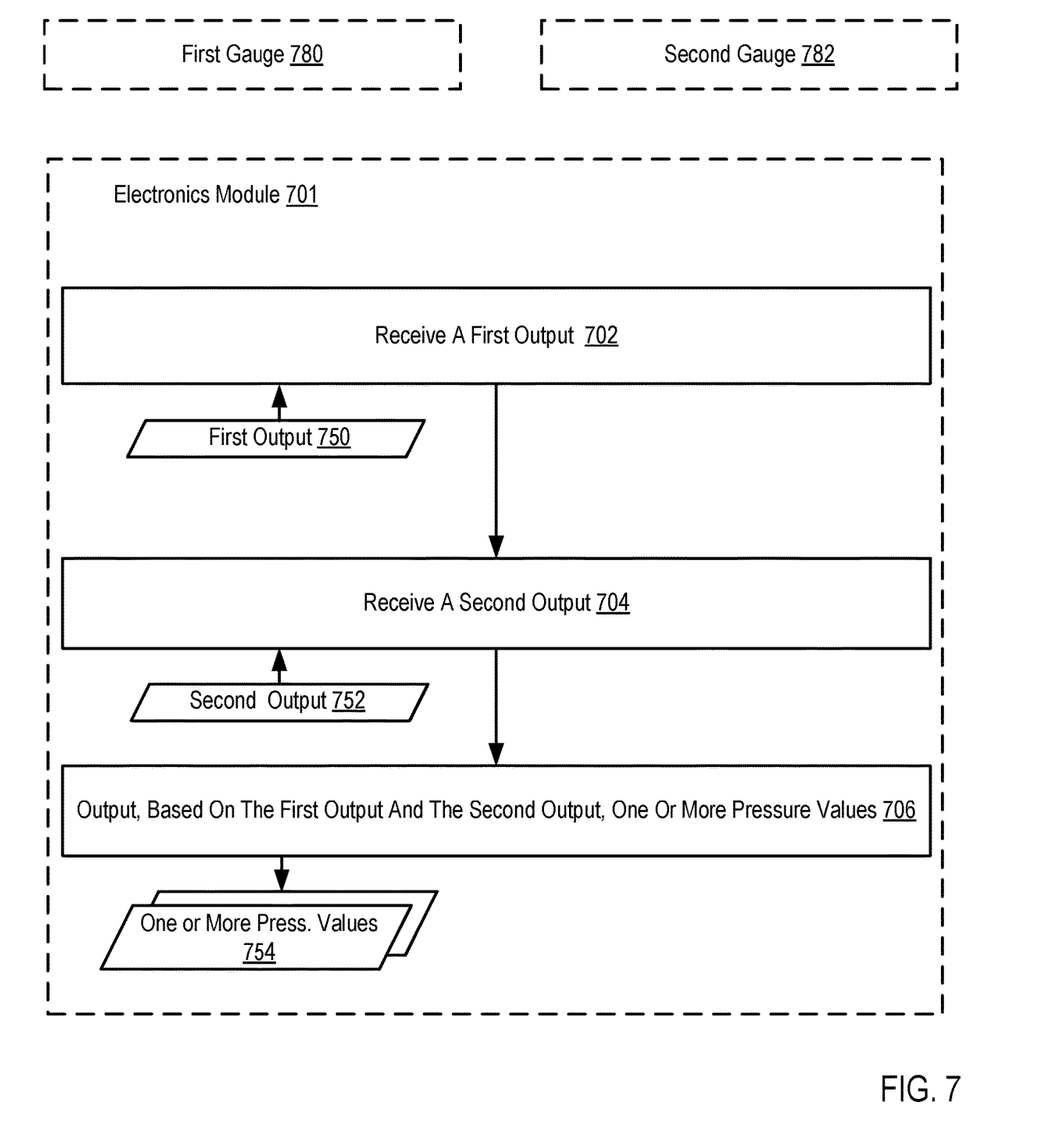
FIG. 7 is a flow chart of an example of a method for strain gauge type pressure sensing, according to at least one embodiment of the present disclosure.

FIG. 7 is a flow chart of an example of a method for strain gauge type pressure sensing, according to at least one embodiment of the present disclosure. The method of FIG. 7 includes an electronics module (701) receiving (702) a first output (750) associated with a resistance of a first strain gauge (780) of a pressure sensor apparatus. In the example of FIG. 7, the first strain gauge (780) is configured to change resistance in response to a change in thickness of a first portion of a diaphragm of the pressure sensor apparatus. Receiving (702), by an electronics module (701), a first output (750) associated with a resistance of the first strain gauge (780) of a pressure sensor apparatus may be carried out by measuring a voltage across one or more leads coupled to the first strain gauge.

The method of FIG. 7 also includes receiving (704), by the electronics module (701), a second output (752) associated with a resistance of a second strain gauge (782) of the pressure sensor apparatus. In this embodiment, the second strain gauge (782) is configured to change resistance in response to a change in thickness of a second portion of the diaphragm. Receiving (704), by the electronics module (701), a second output (752) associated with a resistance of a second strain gauge (782) of the pressure sensor apparatus may be carried out by measuring a voltage across one or more leads coupled to the second strain gauge.

In addition, the method of FIG. 7 includes outputting (706), based on the first output (750) and the second output (752), by the electronics module (701), one or more pressure values (754). The one or more pressure values may represent a pressure reading reported by the electronic module. Outputting (706), based on the first output (750) and the second output (752), by the electronics module (701), one or more pressure values (754) may be carried out by selecting which strain gauge output to represent the pressure measured by the pressure sensor apparatus and generating a value that is associated with the selected output.

Figure 8:
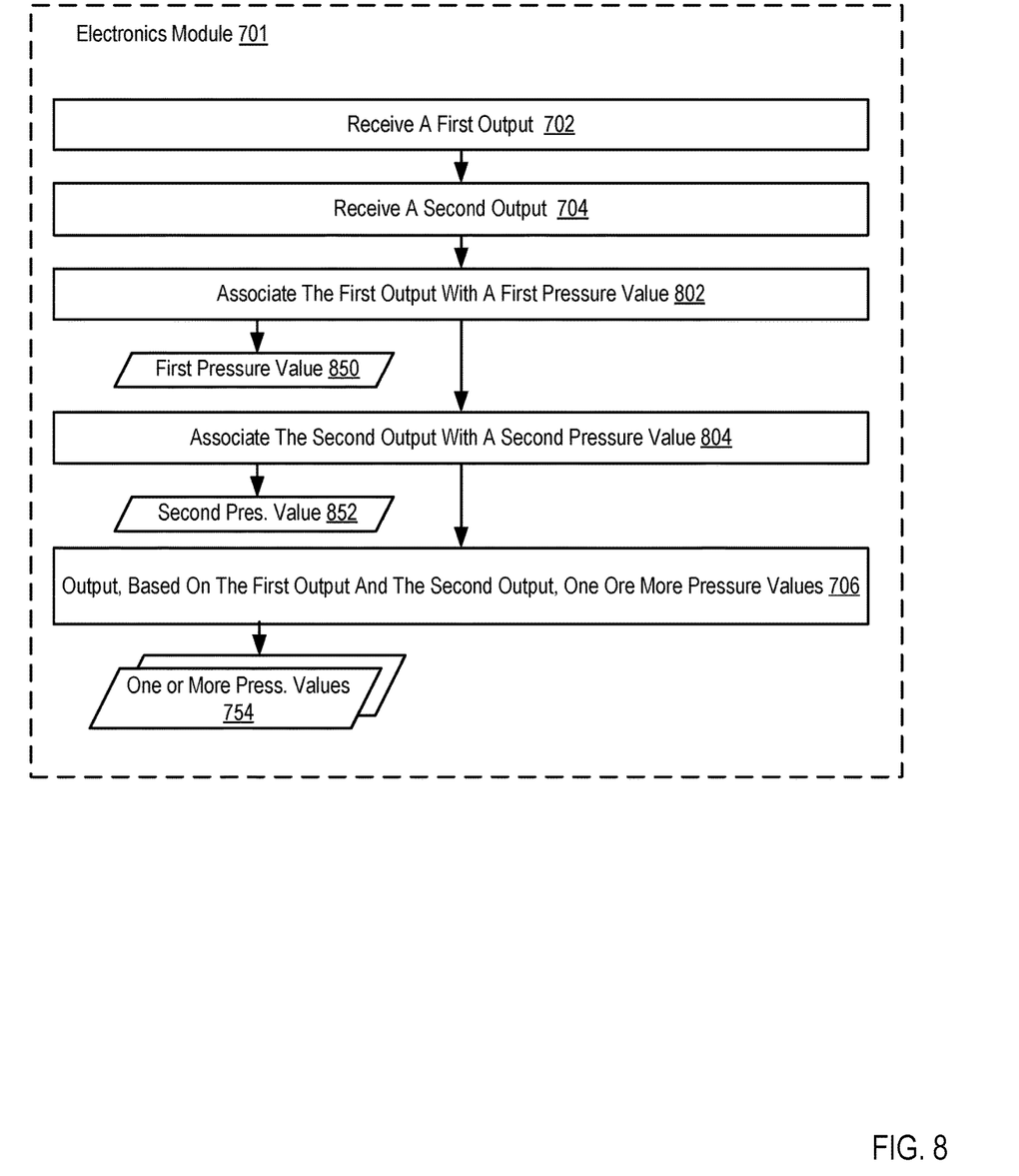
FIG. 8 is a flow chart of an example of a method for strain gauge type pressure sensing, according to at least one embodiment of the present disclosure.

FIG. 8 is a flow chart of an example of a method for strain gauge type pressure sensing, according to at least one embodiment of the present disclosure. The method of FIG. 8 is similar to the method of FIG. 7 in that the method of FIG. 8 also includes receiving (702), by the electronics module (701), a first output (750) indicating a change in resistance of a first strain gauge (780) of a pressure sensor apparatus; receiving (704), by the electronics module (701), a second output (752) indicating a change in resistance of a second strain gauge (782) of the pressure sensor apparatus; and outputting (706), based on the first output (750) and the second output (752), by the electronics module (701), one or more pressure values (754).

In addition, the method of FIG. 8 also includes the electronics module (701) associating (802) the first output (750) with a first pressure value (850). Associating (802), by the electronics module (701), the first output (750) with a first pressure value (850) may be carried out by using a predetermined mapping that matches output values to pressure values.

The method of FIG. 8 also includes the electronics module (701) associating (804) the second output (752) with a second pressure value (852). Associating (804), by the electronics module (701), the second output (752) with a second pressure value (852) may be carried out by using a predetermined mapping that matches output values to pressure values.

Figure 9:
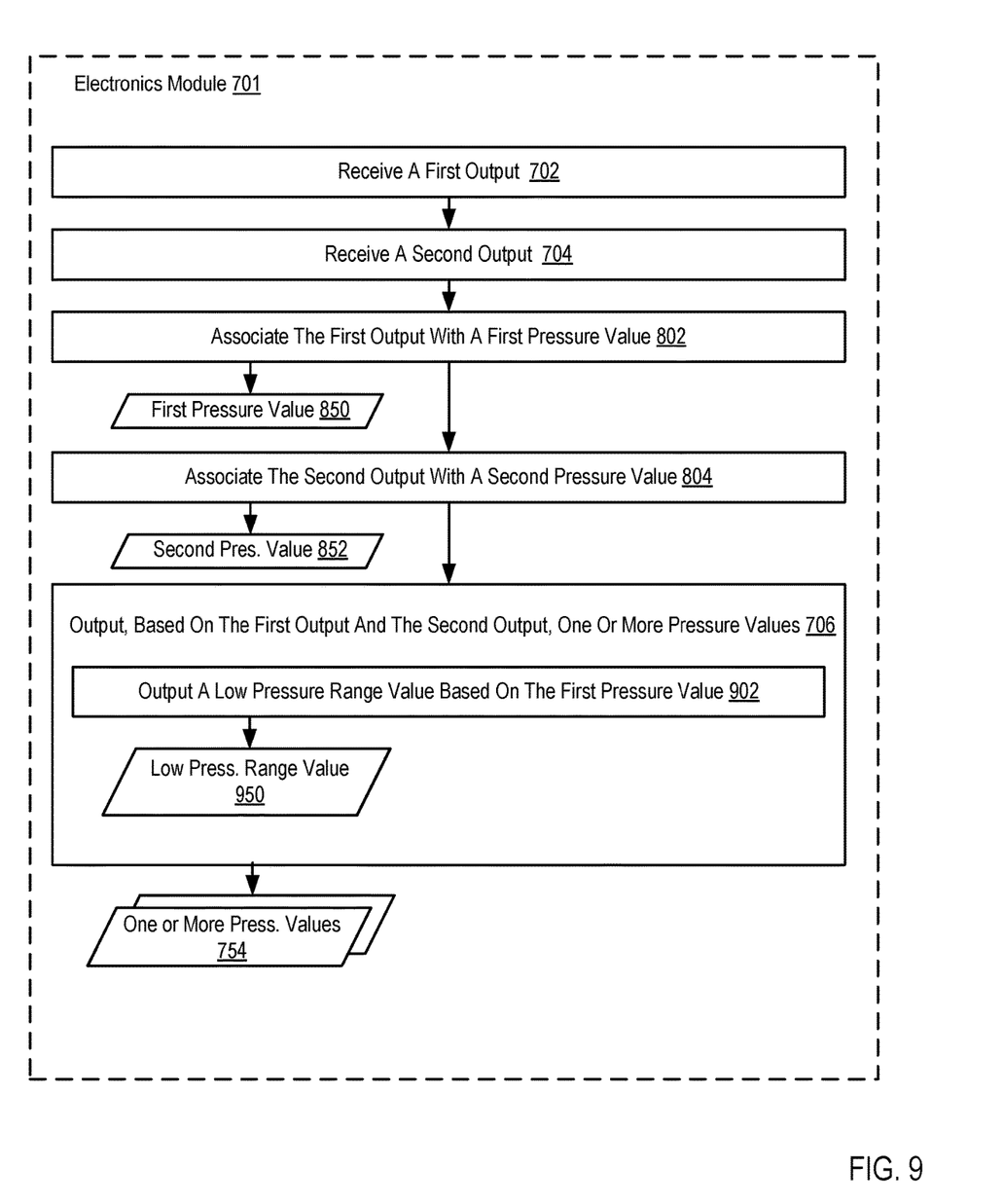
FIG. 9 is a flow chart of an example of a method for strain gauge type pressure sensing, according to at least one embodiment of the present disclosure.

FIG. 9 is a flow chart of an example of a method for strain gauge type pressure sensing, according to at least one embodiment of the present disclosure. The method of FIG. 9 is similar to the method of FIG. 8 in that the method of FIG. 9 also includes receiving (702), by the electronics module (701), a first output (750); receiving (704), by the electronics module (701), a second output (752); associating (802), by the electronics module (701), the first output (750) with a first pressure value (850); associating (804), by the electronics module (701), the second output (752) with a second pressure value (852); and outputting (706), based on the first output (750) and the second output (752), by the electronics module (701), one or more pressure values (754).

In the method of FIG. 9, however, outputting (706), based on the first output (750) and the second output (752), by the electronics module (701), one or more pressure values (754) includes outputting (902) a low-pressure range value (950) based on the first pressure value (850). Outputting (902) a low-pressure range value (950) based on the first pressure value (850) may be carried out by determining that the strain gauge outputs indicate a pressure that is in a low-pressure range; and in response to determining that the strain gauge outputs indicate a pressure that is in a low-pressure range, selecting the output from the first strain gauge. As explained above, one of the advantages of the pressure sensor apparatus described in the present disclosure is having two strain gauges with different sensitivities. The electronics module may be configured to identify which sensitivity more closely aligns with the actual pressure measured by the pressure sensor apparatus. By selecting from a plurality of strain gauge outputs, a particular strain gauge output as a basis for a pressure value output, the electronics module may provide a more accurate pressure reading.

Figure 10:
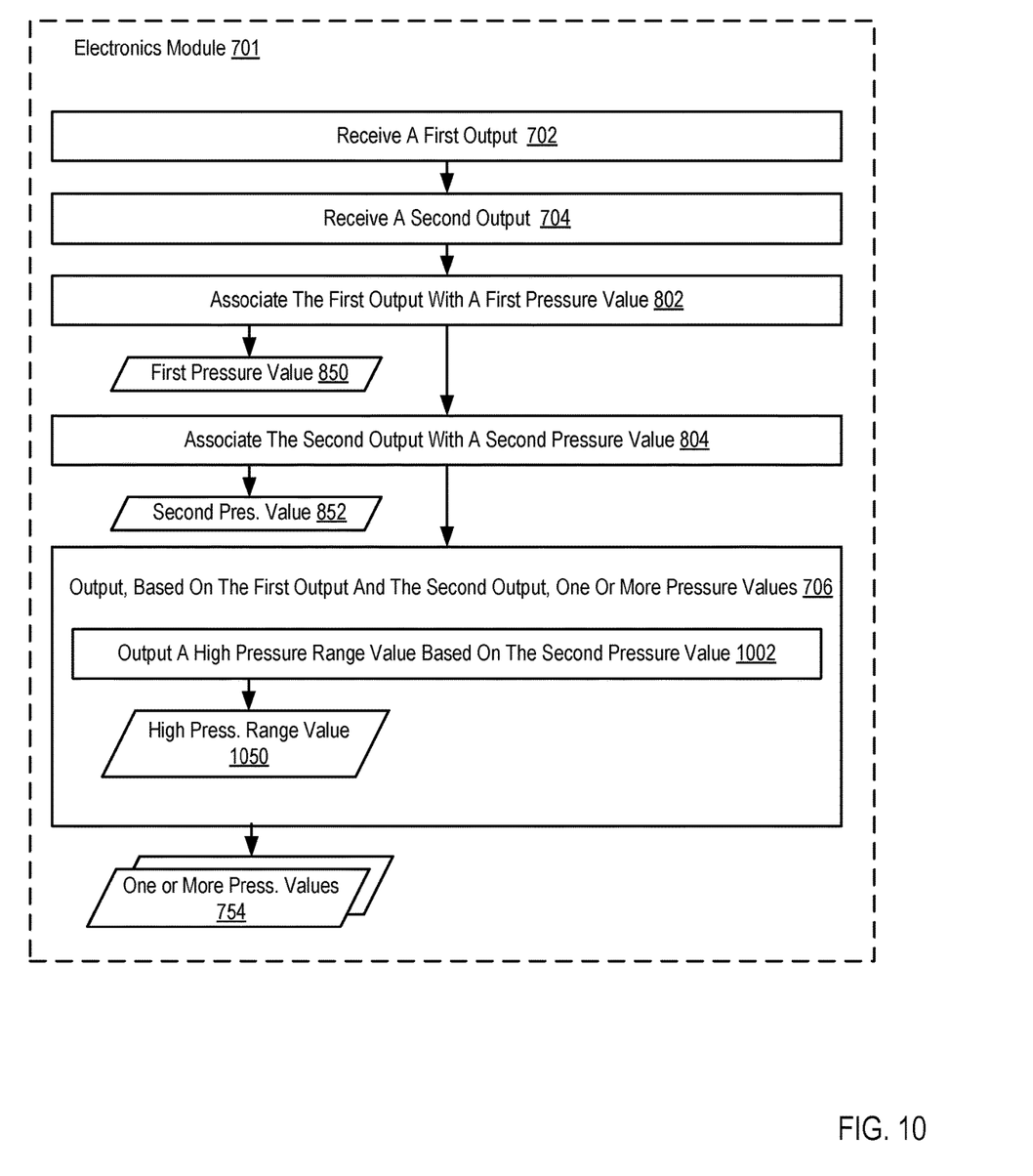
FIG. 10 is a flow chart of an example of a method for strain gauge type pressure sensing, according to at least one embodiment of the present disclosure.

FIG. 10 is a flow chart of an example of a method for strain gauge type pressure sensing, according to at least one embodiment of the present disclosure. The method of FIG. 10 is similar to the method of FIG. 8 in that the method of FIG. 10 also includes receiving (702), by the electronics module (701), a first output (750); receiving (704), by the electronics module (701), a second output (752); associating (802), by the electronics module (701), the first output (750) with a first pressure value (850); associating (804), by the electronics module (701), the second output (752) with a second pressure value (852); and outputting (706), based on the first output (750) and the second output (752), by the electronics module (701), one or more pressure values (754).

In the method of FIG. 10, however, outputting (706), based on the first output (750) and the second output (752), by the electronics module (701), one or more pressure values (754) includes outputting (1002) a high-pressure range value (1050) based on the second pressure value (852). Outputting (1002) a high-pressure range value (1050) based on the second pressure value (852) may be carried out by determining that the strain gauge outputs indicate a pressure that is in a high-pressure range; and in response to determining that the strain gauge outputs indicate a pressure that is in a high-pressure range, selecting the output from the first strain gauge. As explained above, one of the advantages of the pressure sensor apparatus described in the present disclosure is having two strain gauges with different sensitivities. The electronics module may be configured to identify which sensitivity more closely aligns with the actual pressure measured by the pressure sensor apparatus. By selecting, from a plurality of strain gauge outputs, a particular strain gauge output as a basis for a pressure value output, the electronics module may provide a more accurate pressure reading.

Figure 11:
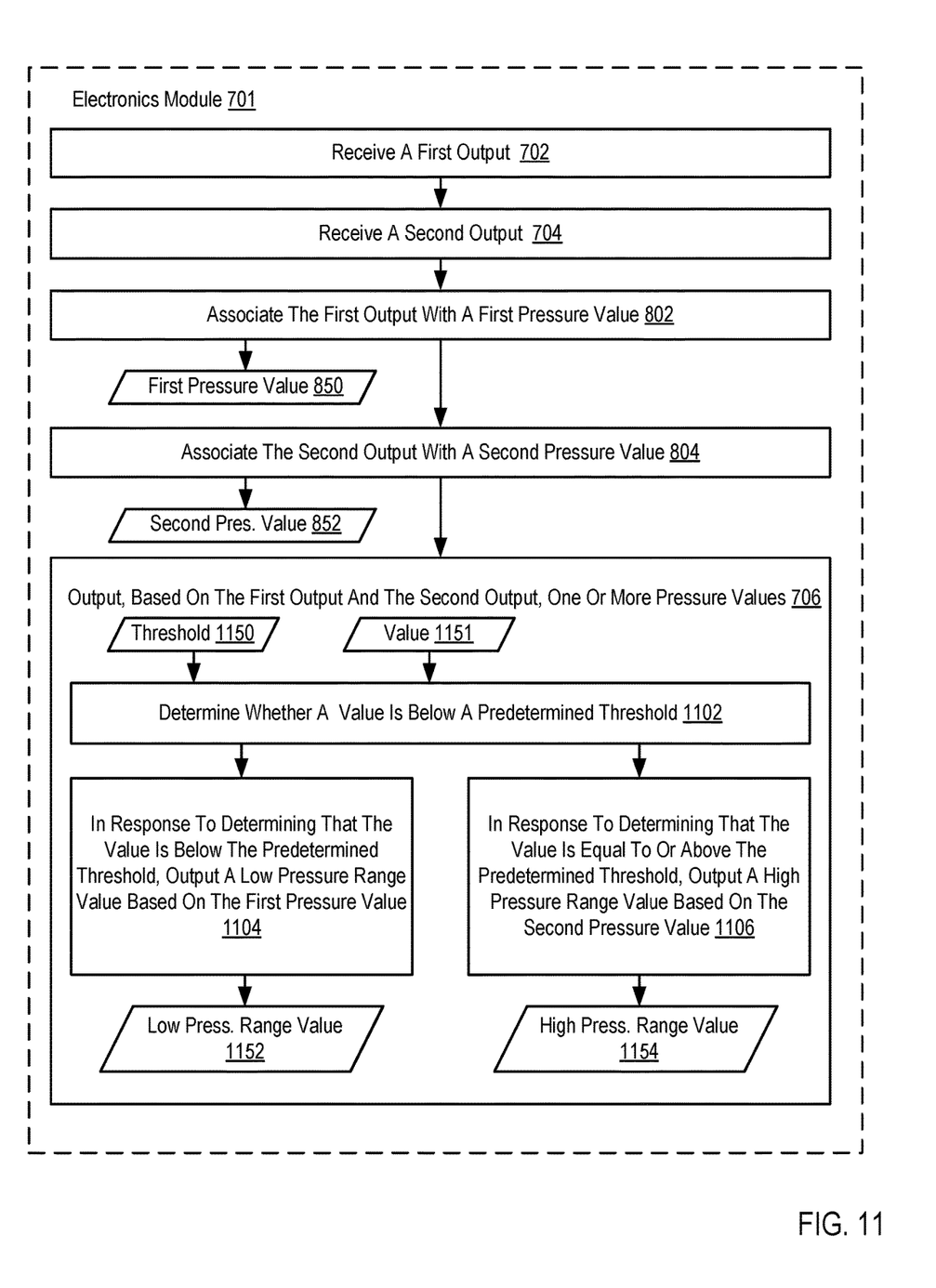
FIG. 11 is a flow chart of an example of a method for strain gauge type pressure sensing, according to at least one embodiment of the present disclosure.

FIG. 11 is a flow chart of an example of a method for strain gauge type pressure sensing, according to at least one embodiment of the present disclosure. The method of FIG. 11 is similar to the method of FIG. 8 in that the method of FIG. 11 also includes receiving (702), by the electronics module (701), a first output (750); receiving (704), by the electronics module (701), a second output (752); associating (802), by the electronics module (701), the first output (750) with a first pressure value (850); associating (804), by the electronics module (701), the second output (752) with a second pressure value (852) and outputting (706), based on the first output (750) and the second output (752), by the electronics module (701), one or more pressure values (754).

In the method of FIG. 11, however, outputting (706), based on the first output (750) and the second output (752), by the electronics module (701), one or more pressure values (754) includes determining (1102) whether a value (1151) is below a predetermined threshold (1150). In a particular embodiment, the value may be one of the first output (750), the second output (752), the first pressure value (850), and the second pressure value (852). Determining (1102) whether the value (1151) is below a predetermined threshold (1150) may be carried out by comparing the value to the predetermined threshold.

In addition, outputting (706), based on the first output (750) and the second output (752), by the electronics module (701), one or more pressure values (754) also includes in response to determining that the value is below the predetermined threshold (1150), outputting (1104) a low-pressure range value (1152) based on the first pressure value (850). Outputting (1104) a low-pressure range value (1152) based on the first pressure value (850), in response to determining that the value (1151) is below the predetermined threshold (1150), may be carried out by determining that the strain gauge outputs or pressure values indicate a pressure that is in a low-pressure range; and in response to determining that the strain gauge outputs indicate a pressure that is in a low-pressure range, selecting the output from the first strain gauge as a basis for a pressure value output from the electronics module.

In addition, outputting (706), based on the first output (750) and the second output (752), by the electronics module (701), one or more pressure values (754) also includes in response to determining that the value (1151) is equal to or above the predetermined threshold (1150), outputting (1106) a high-pressure range value (1154) based on the second pressure value (852). Outputting (1106) a high-pressure range value (1154) based on the second pressure value (852), in response to determining that the value is equal to or above the predetermined threshold (1150), may be carried out by determining that the strain gauge outputs or pressure values indicate a pressure that is in a high-pressure range; and in response to determining that the strain gauge outputs indicate a pressure that is in a high-pressure range, selecting the output from the second strain gauge as a basis for a pressure value output from the electronics module.

As explained above, one of the advantages of the pressure sensor apparatus described in the present disclosure is having two strain gauges with different sensitivities. The electronics module may be configured to identify which sensitivity more closely aligns with the actual pressure measured by the pressure sensor apparatus. By selecting a particular strain gauge output as a basis for a pressure value output, the electronics module may provide a more accurate pressure reading.

The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may be dependent from any or all claims in a multiple dependent manner even though such has not been originally claimed.

What is claimed is:

1. A pressure sensor apparatus for strain gauge type pressure sensing, the pressure sensor apparatus comprising:
   a plurality of strain gauges including a first strain gauge and a second strain gauge;
   a diaphragm coupled between the plurality of strain gauges and an object configured to apply pressure to the diaphragm, the diaphragm having a first portion and a second portion;
   the first portion having a first thickness between the object and the first strain gauge, the second portion having a second thickness between the object and the second strain gauge; in an uncompressed state, the second thickness greater than the first thickness;
   the first strain gauge configured to change resistance in response to a change in thickness of the first portion of the diaphragm; and the second strain gauge configured to change resistance in response to a change in thickness of the second portion of the diaphragm;
   an electronics module that is coupled to both the first strain gauge and the second strain gauge, the electronics module configured to:
   receive a first output associated with a resistance of the first strain gauge;
   receive a second output associated with a resistance of the second strain gauge; and
   output, based on the first output and the second output, one or more pressure values;
   wherein the electronics module is configured to associate the first output with a first pressure value and associate the second output with a second pressure value;
   wherein the electronics module is further configured to:
   determine whether a value is below a predetermined threshold;
   in response to determining that the value is below the predetermined threshold, output a low-pressure range value based on the first pressure value; and in response to determining that the value is equal to or above the predetermined threshold, output a high-pressure range value based on the second pressure value.

2. The pressure sensor apparatus of claim 1 wherein the first strain gauge and the second strain gauge are microfused silicon strain gauges.

3. A method of strain gauge type pressure sensing, the method comprising:
by an electronics module that is coupled to a plurality of strain gauges including a first strain gauge and a second strain gauge:
receive a first output associated with a resistance of the first strain gauge;
receive a second output associated with a resistance of the second strain gauge; and
output, based on the first output and the second output, one or more pressure values;
the plurality of strain gauges coupled to a diaphragm, the diaphragm coupled between the plurality of strain gauges and an object configured to apply pressure to the diaphragm, the diaphragm having a first portion and a second portion;
the first portion having a first thickness between the object and the first strain gauge, the second portion having a second thickness between the object and the second strain gauge; in an uncompressed state, the second thickness greater than the first thickness;
the first strain gauge configured to change resistance in response to a change in thickness of the first portion of the diaphragm; and the second strain gauge configured to change resistance in response to a change in thickness of the second portion of the diaphragm;
associating, by the electronics module, the first output with a first pressure value; and
associating, by the electronics module, the second output with a second pressure value:
wherein outputting, based on the first output and the second output, by the electronics module, one or more pressure values includes:
determining whether a value is below a predetermined threshold;
in response to determining that the value is below the predetermined threshold, outputting a low-pressure range value based on the first pressure value; and
in response to determining that the value is equal to or above the predetermined threshold, outputting a high-pressure range value based on the second pressure value.

4. The method of claim 3 wherein the first strain gauge and second strain gauge are microfused silicon strain gauges.

5. A computer readable storage medium for strain gauge type pressure sensing, the computer readable storage medium including computer program instructions that when executed by a processor cause the processor to:
by an electronics module that is coupled to a plurality of strain gauges including a first strain gauge and a second strain gauge:
receive a first output associated with a resistance of the first strain gauge;
receive a second output associated with a resistance of the second strain gauge; and
output, based on the first output and the second output, one or more pressure values;
the plurality of strain gauges coupled to a diaphragm, the diaphragm coupled between the plurality of strain gauges and an object configured to apply pressure to the diaphragm, the diaphragm having a first portion and a second portion;
the first portion having a first thickness between the object and the first strain gauge, the second portion having a second thickness between the object and the second strain gauge; in an uncompressed state, the second thickness greater than the first thickness;
the first strain gauge configured to change resistance in response to a change in thickness of the first portion of the diaphragm; and the second strain gauge configured to change resistance in response to a change in thickness of the second portion of the diaphragm;
associating, by the electronics module, the first output with a first pressure value; and
associating, by the electronics module, the second output with a second pressure value;
wherein outputting, based on the first output and the second output, by the electronics module, one or more pressure values includes:
determining whether a value is below a predetermined threshold;
in response to determining that the value is below the predetermined threshold, outputting a low-pressure range value based on the first pressure value; and
in response to determining that the value is equal to or above the predetermined threshold, outputting a high-pressure range value based on the second pressure value.

6. The computer readable storage medium of claim 5, wherein the value is one of the first output, the second output, the first pressure value, and the second pressure value.

7. The computer readable storage medium of claim 5 wherein the first strain gauge and second strain gauge are microfused silicon strain gauges.

* * * * *